United States Patent [19]

Aldrich

[11] 4,222,267
[45] Sep. 16, 1980

[54] MATERIAL LEVEL DETECTOR CIRCUIT

[75] Inventor: Joe L. Aldrich, Kingwood, Tex.

[73] Assignee: Keystone International, Inc., Houston, Tex.

[21] Appl. No.: 877,028

[22] Filed: Feb. 10, 1978

[51] Int. Cl.$^2$ ............................................. G01F 23/26
[52] U.S. Cl. ................................... 73/304 C; 340/620
[58] Field of Search ....................... 73/304 C; 340/620

[56] References Cited

U.S. PATENT DOCUMENTS

| | | | |
|---|---|---|---|
| 2,932,970 | 4/1960 | Zito | 73/304 C |
| 3,807,231 | 4/1974 | Spaw | 73/304 C |
| 3,864,974 | 2/1975 | Rauchwerger | 73/304 C |

*Primary Examiner*—S. Clement Swisher
*Attorney, Agent, or Firm*—Browning, Bushman & Zamecki

[57] ABSTRACT

Disclosed are apparatus and methods for detecting the presence, or absence, of material at a predetermined location. An oscillator generates a constant-frequency, constant-amplitude signal which is fed through a load resistor to an antenna probe positioned at the sensing location. The amplitude of the signal fed to the antenna probe varies as the impedance of the antenna probe is affected by material in its environment, or lack thereof. The signal amplitude is converted into a d-c voltage level, and is transmitted to a switching circuit which provides an output signal depending on a comparison between the d-c voltage level and a reference voltage level. The sensitivity of the switching circuit is adjustable to accommodate the degree to which the particular material, whose presence or absence is to be detected, affects the impedance of the antenna probe. The output from the switching circuit may be used to operate one or more devices indicative of the environment of the antenna probe and/or affecting the environment by adding to and/or removing therefrom material affecting the impedance of the antenna probe.

47 Claims, 4 Drawing Figures

MATERIAL LEVEL DETECTOR CIRCUIT

BACKGROUND OF THE INVENTION

1. Field of the Invention

The present invention pertains to apparatus and methods for detecting the presence or absence of material at a predetermined location. More particularly, the present invention relates to systems for determing the amount of material accummulated at a locale. Apparatus and methods of the present invention find particular application in the case of material storage in containers, such as bins, wherein the amount of material present may be determined by detecting the level of the material. Appropriate indicators, or warning devices, may be triggered ultimately by use of the present invention, and systems for adding material, or removing material, may also be operated in response to the detection of the material level by use of the present invention.

2. Description of the Prior Art

Several prior art systems available for measuring material level in bins include the use of mechanical probes which extend into the bin. Such a probe is made to vibrate, and the physical characteristics of the elastic disturbances, which are affected by the quantity of material present about the probe, are analyzed in terms of the quantity of material present.

Other prior art devices rely upon the variation of one or more electrical properties affected due to the presence of material at different levels within the bin. Thus, capacitive reactance of one or more probes may be affected to signal the amount of material present. The operation of an oscillator circuit, including a resonant probe, may be affected to operate a control system in response to the presence of material near the resonant probe.

U.S. Pat. Nos. 3,807,231 and 3,935,970 disclose a measuring system, and related control system, wherein the reactance of an antenna probe varies as a function of the level of material in the container adjacent the antenna. The antenna reactance controls the frequency of a transmitter signal, which is then combined with a constant frequency reference signal. The frequency of the resulting difference signal is used to operate a material level indicator and to provide control information for operating automatic systems for controlling the material level.

An amplitude-modulated detector circuit is disclosed in U.S. Pat. Application Ser. No. 844,040, filed Oct. 20, 1977 now Pat. No. 4,169,543. There, a crystal-controlled oscillator generates a constant-amplitude signal which is fed through a load resistor to an antenna probe circuit. Variations in the amplitude of this loaded signal, due to the presence of material to be detected about the antenna probe, are reflected in variations in the value of a d-c voltage level. This variable voltage level is combined with a reference voltage level and the resulting signal is fed to a switching circuit. The switching circuit provides an output signal depending on a comparison between the combined signal and a second reference voltage level.

SUMMARY OF THE INVENTION

Apparatus of the present invention includes an antenna probe which combines with a load resistor to form an impedance bridge on which is impressed a constant-frequency, constant-amplitude signal generated by an oscillator. The antenna probe extends to a location at which the presence or absence of material is to be detected. Thus, the antenna probe may be located at a predetermined level within a bin, or other material container.

When material comes sufficiently close to the antenna probe, the latter's load impedance is affected due to the change in permeativity and permeability of the environment. This impedance change may be due, for example, to a capacitive reactance change, a pure resistance change, or a combination of the two. As a result of the consequent drop in antenna probe inpedance due to the presence of material in the antenna probe environment, the amplitude of the signal impressed on the impedance bridge decreases between the load resistor and the antenna sensor circuit.

The signal across the impedance bridge, whose amplitude is thus a reflection of the presence or absence of material about the antenna probe, is rectified and integrated by a converter circuit to produce a d-c voltage level whose value is therefore also dependent on the presence or absence of material about the antenna probe. This variable d-c voltage level is transmitted to the comparator of a switching circuit where the voltage level is compared to a reference level. The output of the switching circuit is dependent on whether the variable d-c voltage level is less than the comparator reference. Thus, the presence or absence of material about the antenna probe determines the relative value of the d-c voltage level compared to the comparator reference level of the switching circuit. The output signal from the switching circuit may also be provided in analog form.

The switching circuit output may, in turn, be used to operate a control unit, or other system, whereby indicator or warning devices may be triggered in response to the presence or absence of material about the antenna probe. Also, systems designed to add material to the bin, or other container, in which the antenna probe is located may be operated based on the output from the switching circuit, as well as may systems designed to remove material from the container.

The sensitivity of the switching circuit may be adjusted to accommodate variations in the effect different materials to be detected may have on the impedance of the antenna probe. Thus, where the present invention is to be used to detect the level of, say, plastic or other materials having relatively small effects on the impedance of the antenna probe, the sensitivity of response of the switching circuit is maintained high. Where levels of materials, such as cement, having relatively large effects on the antenna probe impedance are to be determined, the sensitivity of the switching circuit is set low. It is advantageous to adjust the circuitry of the present invention to maintain a sensitivity of the switching circuit reflecting such relative strength of influence on the impedance of the antenna probe. If the sensitivity is thus too high, the switching circuit may respond to noise, or other extraneous signals. If the sensitivity is too low, the switching circuit may not respond appropriately when the level of the material about the antenna probe does effect an impedance change.

The switching circuit comparator is equipped with a positive feed back loop with changes the input to the switching circuit each time the switching circuit output is altered. As a result, after one such change in switching circuit output level due to the variable d-c voltage level exceeding or falling below that of the comparator reference level, the variable voltage level must change at least through a predetermined voltage range to effect another variation in the switching circuit output. Consequently, the impedance of the antenna probe must change through an impedance range to alter the switching circuit output. The purpose of this hysteresis effect in the switching circuit is to prevent unwanted variations in the switching circuit output signal due to such causes as noise, or minute changes in antenna probe impedance that might occur while the variable d-c voltage level is close to that of the comparator reference level. Thus, a false reading of the presence or absence of material about the antenna probe, due to such extraneous causes, may be avoided both by the feedback loop as well as by a proper adjustment of the switching circuit sensitivity.

The switching circuit is equipped with a display device, a light emitting diode, and functions also as a calibration circuit for the detector circuitry. With the antenna probe in place, such as positioned within a bin, and the environment of the antenna probe free from impedance-affecting material, the detector circuitry is calibrated. Thus, the sensitivity control is adjusted to maximize the sensitivity of the switching circuit, and the load resistor of the impedance bridge is adjusted so that the variable d-c voltage level is just above the reference level value. Thereafter, the sensitivity control may be appropriately set to reflect the nature of the material to be detected by the antenna probe.

In a method of the present invention, an antenna probe is provided at a location where the presence or absence of material is to be detected. The antenna probe forms a portion of an impedance bridge, which is loaded with a constant-frequency, constant-amplitude oscillatory signal. The oscillatory signal is rectified and integrated to provide a d-c voltage level reflecting the impedance of the antenna probe. This variable voltage signal is compared in a switching circuit to a reference level and, depending on the comparison, an output votage level is made to take on one or another value. The entire circuitry is calibrated to the environment, free from material to be detected, in which the antenna probe is to be used. The sensitivity of the switching circuit is adjusted in accordance with the relative influence the material whose presence or absence is to be detected is capable of having on the impedance of the antenna probe. Thus, to detect the presence of low-influence material, the sensitivity of the switching circuit is set at a high value. Where higher-influence materials are to be detected, the sensitivity is decreased accordingly. With the circuitry thus calibrated, and the sensitivity appropriately set, the amplitude of the signal loaded on the antenna probe is made to vary depending on the variation in the load impedance of the antenna probe due to the presence or absence of material surrounding the antenna probe. The amplitude modulation of the signal across the impedance bridge is reflected by variations in the d-c voltage level applied to the switching circuit. Thus, with the varying d-c voltage signal compared to the reference level in the switching circuit, an output signal is generated whose value depends on whether the antenna probe is adjacent to material which affects its load impedance.

The output signal generated in response to the presence or absence of material about the antenna probe, according to the present invention, may be used to control a variety of ancillary devices. For example, indicator and display devices may be used to show the presence or absence of material at the level of the antenna probe. Also, warning devices may be triggered by the output signal. Systems designed to add material to the container in which the antenna probe is positioned may also be turned on or off according to the value of the output signal from the detector of the present invention. Similarly, systems designed to remove material from such a container may be controlled according to the output signal from the detector.

The antenna probe of the present invention may be of any conventional design, and may be constructed to be sufficiently durable to withstand the impact of heavy and/or abrasive materials whose presence, or absence, is to be detected. Similarly, the entire detector may be fabricated relatively compactly. Furthermore, the oscillator used to generate the constant-amplitude signal loaded on the impedance bridge may be designed to exhibit a relatively large drive capability. Thus, the amplitude of the loaded signal may be maintained sufficiently high to provide a relatively large signal-to-noise ratio at the switching circuit even though the antenna probe is subject to heavy impedance loading. Thus, the physical size of the antenna probe that may be used with the present invention may be relatively large, to provide an antenna extending a relatively large distance into the interior of a bin, or other container.

It will be appreciated that the detector of the present invention provides a relatively stable and reliable oscillatory signal for loading the antenna probe. The switching circuit hysteresis effect further ensures a degree of stability in the output signal from the detector to heighten the fidelity of the detector output signal as reflecting the presence or absence of material at the location of the probe. The ability to adjust the sensitivity of the switching circuit in accordance with the nature of the material whose presence is to be detected also enchances the reliability with which the detector of the present invention may be used to signal the presence or absence of the material at the antenna probe while, at the same time, avoiding an undue loss in the signal-to-noise ratio at the switching circuit.

It will be appreciated that the method and apparatus of the present invention may be employed in a variety of situations, and to detect the presence or absence of a variety of materials. Also, more than one such detector of the present invention may be utilized in a given application as noted hereinafter.

DESCRIPTION OF PREFERRED EMBODIMENTS

Figures 1, 2:
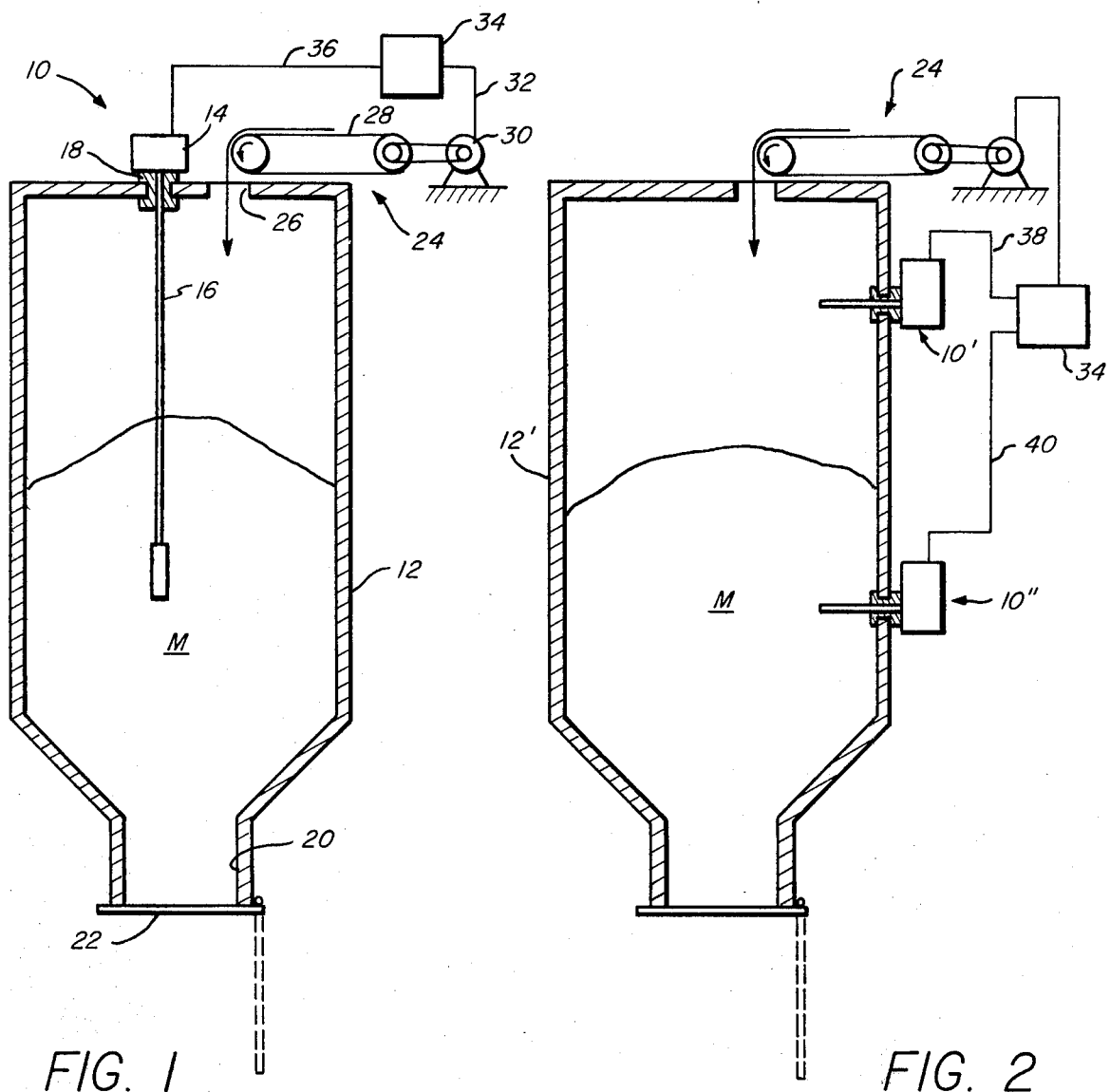
FIG. 1 is a vertical cross-sectional view illustrating a material container equipped with a detector according to the present invention connected to a material feed mechanism.
FIG. 2 is a view similar to FIG. 1, showing use of the detector in different positions.

In FIG. 1, the detector of the present invention, shown generally at 10, is mounted at the top of a bin, or material container 12 containing a quantity of material M. The detector 10 includes a unit 14 containing electrical circuitry, an antenna probe 16 extending downwardly within the bin 12, and a connector 18 by which the detector 10 is mounted on the bin while the antenna probe is insulated from the bin walls. The bin 12 is of conventional construction, having a dispensing opening 20 at its lower end which is covered by a hinged door 22. When the door 22 is moved into the dotted line position, material within the bin 12 flows by gravity from the opening 20.

A material feed system, shown generally at 24, is located at the top of the bin 12 to introduce material into the bin through an opening 26. The feed system 24 is shown schematically to include a conveyor belt 28 operated by a motor 30 which in turn is joined by an appropriate connector 32 to a control unit 34. Control unit 34 is connected by an appropriate connector 36 to the electrical circuitry within the detector 10. Thus, as will be more fully explained hereinafter, the detector 10 may operate the control unit 34 in response to the detector sensing material at a certain level within the bin, whereby the control unit may, for example, cause the feed system at 24 to cease adding material to the bin.

In FIG. 2, a bin 12' is equipped with a detector 10' positioned along one side of the bin. The material feed system at 24 is again operable by way of the control unit 34, which is connected to the detector 10' by an appropriate connector 38. A second detector 10" is positioned along the side of the bin 12' at a lower level than that of the detector 10', and is connected to the control unit 34 by an appropriate connector 40. In this application, the lower level detector 10" may function, through the control unit 34, to initiate the addition of material to the bin 12' while the upper level detector 10' may cause the cessation of such material addition.

Figure 3:
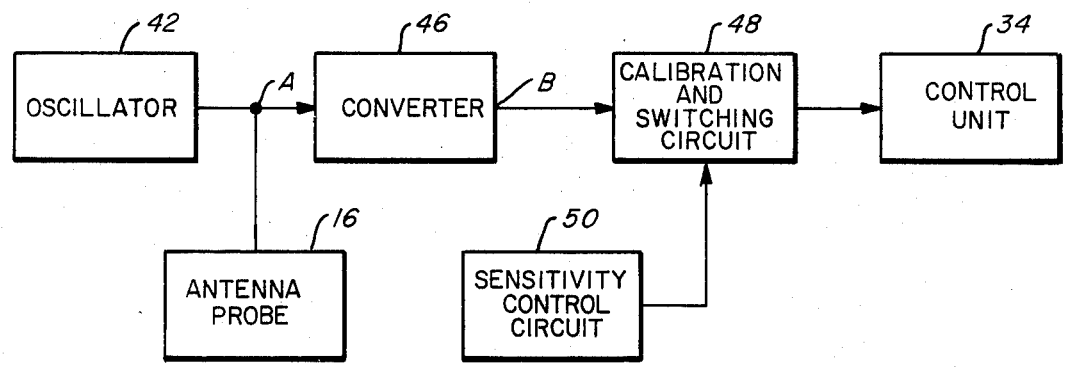
FIG. 3 is a block diagram indicating features of the present invention.

The electrical circuitry of the level detector of the present invention is indicated generally in FIG. 3. An oscillator 42 provides a constant-frequency, constant-amplitude signal. The antenna probe 16 is loaded with the signal from the oscillator 42. The impedance of the antenna probe 16 is dependent on whether the antenna probe is immersed in material, such as M of FIGS. 1 and 2. Generally, as material builds up about the antenna probe 16, its impedance load, and the amplitude of the signal at point A decreases. The signal from point A is transformed by a converter 46 into a d-c voltage level dependent on the amplitude of the signal at A. The variable d-c voltage level produced at point B by the converter 46 is transmitted to a calibration and switching circuit 48. Within the switching circuit 48 the signal from B is compared to a reference voltage level and, based on such comparison, operates to move the switching circuit 48 between one configuration and another. A sensitivity control circuit 50 adjusts the reference level within the switching circuit in accordance with the possible effect on the antenna probe of the material whose presence about the probe is to be determined. The configuration of the switching circuit 48 determines the output to the control unit 34. While the control unit 34 is shown in FIGS. 1 and 2 as an element external to unit 14 of the detectors 10, 10' and 10", the control unit may be included therein as an integral part of the electronic circuitry of the detector.

Figure 4:
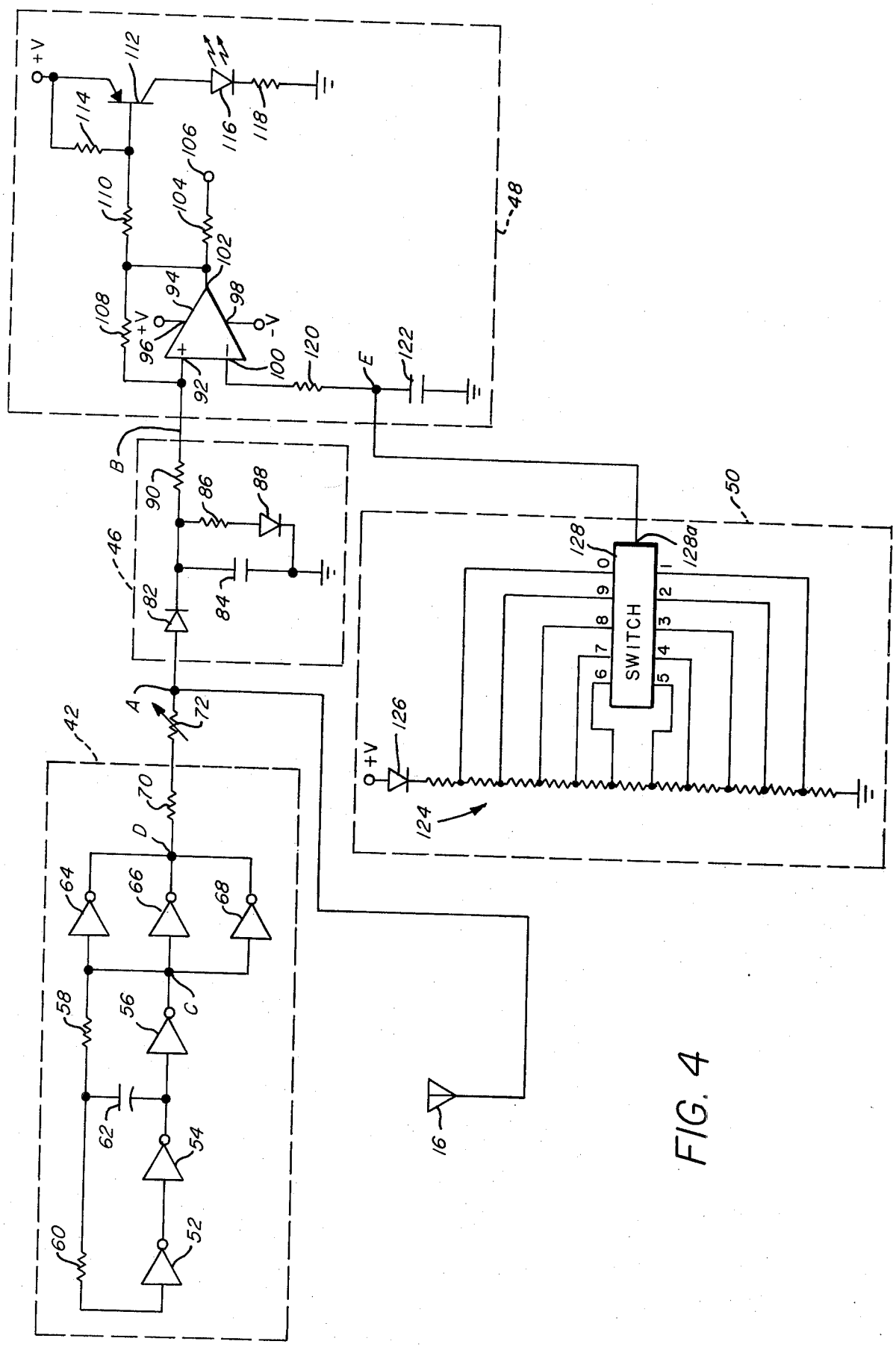
FIG. 4 is a schematic diagram of the electrical circuitry employed in a preferred form of the present invention.

The elements 42–50 shown in FIG. 3 are generally indicated as including the components within dashed line boxes in FIG. 4. In the oscillator 42, a system of three inverters 52, 54, and 56 is arranged in series, with the output of the series from inverter 56 looped through resistors 58 and 60 to the input of the first inverter 52. Such a series of three inverters is known to generate an oscillatory signal about the loop, with the frequency of the signal determined by the delay times inherent in the operation of each individual inverter. A capacitor 62 is positioned across the loop to slow and stabilize the frequency of oscillations produced by the inverter series. Thus, a relatively constant-frequency, constant-amplitude signal is available at point C.

The oscillatory signal C is impressed across three inverters 64, 66, and 68 arranged in parallel as a buffer. The effect of the buffer is to increase the drive capability of the oscillatory signal. Therefore, the output signal provided at point D is capable of sustaining relatively large amplitudes even when impressed across heavy loads. Consequently, as noted hereinafter, the signal generated by the oscillator 42 may be employed with antenna probes of increased length.

A constant-frequency, constant-amplitude wave is produced at the point D of the oscillator 42 to be fed through a coupling resistor 70. The wave emerging from the resistor 70 may be of any shape, but, as an example, a square wave will be considered herein. The square wave is loaded across a variable load resistor 72 to the point A. The resistor 72 combines with the antenna probe 16 to constitute an impedance bridge. Due to the relatively high frequency of the square wave (typically, the capacitor 62 is selected so that a one MHz frequency signal is produced), this impedance bridge is primarily capacitive in nature. At the point A, the square wave has become a generally saw-tooth wave due to the resistor 72 and the loading of the antenna probe 16. The shape and amplitude of the saw-tooth wave at A is then determined by the impedance load on the antenna probe 16 of the sensor circuit 44.

The saw-tooth signal at point A is received by the converter 46 through a semiconductor diode 82. The diode 82 rectifies the signal, passing only the positive portions thereof to a filter/integrator including a capacitor 84 arranged in parallel with a resistor 86 and a diode 88. The filter/integrator produces a positive d-c voltage level whose value is proportional to the amplitude of the saw-tooth signal at point A. The output from the filter/integrator of the converter 46 is fed to point B through a coupling resistor 90. Thus, as the impedance load of the antenna probe 16 is caused to decrease due to material build-up about the antenna probe, the amplitude of the saw-tooth signal at A decreases, and the voltage level impressed upon the coupling resistor 90 decreases.

The modulated d-c voltage level at B is fed to the positive, or non-inverting input 92 of an operational amplifier 94 used as a comparator in the calibration and switching circuit 48. Power levels +V and −V are provided at power terminals 96 and 98, respectively. A reference voltage level is impressed at the negative, or inverting, input 100 of the comparator 94. Thus, the value provided by the comparator 94 at its output terminal 102 is +V as long as the voltage level at the input 92 does not fall in value below that at the reference input 100. If the voltage value at the input 92 falls below that at the input 100, the voltage level output at the terminal 102 becomes −V.

The voltage value +V or −V from the output terminal 102 of the comparator 94 is transmitted through a coupling resistor 104 to a circuit output terminal 106. The switching circuit output signal is available at the terminal 106 for transmission to the control unit 34 (FIGS. 1–3), or to some other signalling or operating device. Thus, the calibration and switching circuit 48 is made to assume one configuration or another, that is, to produce an output signal of one value or another in response to material being present or not present in the vicinity of the antenna probe 16. In turn, the two-value signal thus generated by the calibration and switching circuit 48 serves as an input signal to, say, the control unit 34. There, this input signal may be used to operate one or more relays, for example, to control the operation of the material feed system at 24 in FIGS. 1 and 2, and/or to operate one or more warning or indicator devices to convey information as to the level of material within the bin 12 or 12'. Such control and display devices, which may be chosen appropriate to the application of the detector of the present invention, are well known in the art and are not described in further detail herein. Similarly, the switching circuit may also provide an analog output signal dependent on the value of the modulated signal at B.

To provide a hysteresis effect, the comparator 94 is equipped with a positive feedback from the output terminal 102 to the input terminal 92 through a resistor 108. Resistors 90 and 108 cooperate to form a voltage divider between the d-c voltage level produced by the converter 46 and the output of the comparator at 102. Typically, the d-c voltage level from the converter 46 is in the range of 2.5 volts, while the comparator output 102 is ±6 volts. With the preponderance of the voltage drop in the voltage divider occuring across resistor 108, a hysteresis effect of approximately ±20 millivolts may be present at input 92. Thus, as the output level at the terminal 102 is made to vary between +V and −V, the d-c voltage level produced by the converter 46 has added to it a voltage of, for example, ±20 millivolts. The effect is to require the voltage level at point B, which is fed to the input 92 of the comparator 94, to vary by at least 20 millivolts to cause the output of the comparator 94 to change, once the variation in the voltage level at B has initially caused the comparator to change its output. Thus, relatively negligible changes in the voltage level at B, due to possible noise or other interference, for example, acting on the antenna probe 16, will not cause unwanted fluctuations in the output of the comparator 94.

The signal from the output terminal 102 is fed through a resistor 110 to the base of a transistor 112 of the p-n-p type. The emitter of the transistor 112 is joined to a +V power source, which is also connected to the transistor base through a resistor 114 of relatively low resistance. The collector of the transistor 112 is connected to a light-emitting-diode (LED) 116. The other side of the LED 116 is connected to ground through a resistor 118.

With the output of the comparator 94 at +V, the positive signal on the base of the transistor 112 prevents flow of current through the emitter, and no current flows through the LED 116. In that case, no light is emitted from LED 116. When the output from the comparator 94 goes to −V, current flows from the +V power source through the emitter to the base of the transistor 112. With a negative signal on the base of the transistor 112, current flows through the LED 116, causing the latter to emit a light signal. Thus, with the amplitude of the signal at A such that the d-c voltage value at input 92 is greater in value than the reference level at the input 100 of the comparator 94, the output signal at the terminal 106 is approximately +V, and the positive signal on the base of the transistor 112 results in the LED 116 not being lit. With the amplitude of the signal at point A decreased to cause the d-c voltage level at input 92 to fall below the value of the reference level at input 100 of the comparator 94, the output signal at terminal 106 is approximately −V, and the negative signal on the base of the transistor 112 results in the LED 116 emitting light.

The reference voltage level at the input 100 of the comparator 94 is supplied by the sensitivity control circuit 50 through a combination of a resistor 120 and a grounded capacitor 122 arranged as a filter. The sensitivity control circuit 50 includes a voltage divider constructed of eleven resistors indicated generally at 124, arranged in series between ground and a semiconductor diode 126. The anode of the diode 126 is connected to a +V power source which provides the voltage across the voltage divider. Diode 126 acts as a temperature compensating device to cause the voltage across the voltage divider to vary equally with the voltage at point B as a result of temperature fluctuations.

Contacts between each of the resistors at 124 in the voltage divider may be selectively joined to the point E between the resistor 120 and the capacitor 122 by means of a switch 128. The selection of the contact point on the voltage divider is effected by positioning the switch 128 to connect the central terminal 128a, leading to point E, with any one of terminals 1–9 and 0. The resulting positive voltage value at point E is larger for the higher terminal numbers of the switch 128 (0 being the highest in this case), and lower for the lower terminal numbers. Settings 1–9 of the switch 128 are operating settings to control the sensitivity of performance of the switching circuit 48; setting 0 of the switch 128 is used in adjusting, or calibrating, the circuitry, as described hereinafter. The higher the setting of the switch 148 regarding the terminals 1–9 and 0, with 0 being the highest, the higher the voltage value at point E and, therefore, at the input 100 of the comparator 94. For such high values of the reference voltage level at the input 100 the output signal at the terminal 106 of the switching circuit 48 is changed in response to material encompassing the antenna probe 16 with a relatively small decrease in the d-c voltage value at point B. For lower settings of the switch 128, resulting in lower voltage values at point E and, therefore, at input 100, greater changes in the d-c voltage value at B are required to alter the output signals at the terminal 106. Thus, the sensitivity of performance of the switching circuit is increased as the setting of switch 128 is increased in terminal number, with setting 9 being the most "sensitive" operating position of the switch. Accordingly, setting 1 is the least "sensitive" setting of switch 128.

The setting of variable resistor 72 determines the operating level of the amplitude of the wave at point A and, therefore, the operating level of the d-c voltage signal at point B. The detector circuitry may be adjusted, or calibrated, as follows. The antenna probe 16 is positioned within the container, such as the bin 12, in which the probe is to be used, and is maintained free from surrounding, impedance-altering material. The switch 128 of the sensitivity control circuit 50 is placed in position 0, impressing a maximum voltage at point E. Then, the variable resistor 72 is adjusted so that the LED 116 just goes off. This action by the LED 116 indicates that the voltage value at the input 92 is just above the reference voltage value at input 100. When this occurs the detector circuitry is properly tuned with respect to the bin 12 in which the antenna probe 16 is positioned.

Once the detector circuitry has been properly calibrated, the switch 128 is positioned on an operating terminal 1-9 in accordance with the electrical properties of the material whose level is to be detected within the bin 12. For materials having relatively little influence on the impedance of the antenna probe 16, the switch 128 is positioned at a relatively high value terminal number. Thus, where materials such as plastic are to be stored in the bin 12, position 9 may be selected for switch 128. Where materials that have greater effects on the impedance of the antenna probe 16 are to be detected, lower terminal number values of switch 128 are used. Thus, for example, with cement being stored in bin 12, the switch 128 may be placed in position 1.

The detector of the present invention may be positioned at any location as desired to detect the presence or absence of material which may affect the impedance load on the antenna probe 16. Such changes occur due to the presence or absence of such material affecting the permeativity or permeability of the spatial area into which the electromagnetic fields induced by the antenna probe signal are radiated. With the detector in place, and with no such materials surrounding the antenna probe 16, and with the sensitivity control switch 128 in the 0 position, the detector circuitry is adjusted as described hereinbefore by appropriately setting resistor 72 to cause the LED 116 to just go off. At that point, the voltage level at the input 92 of the comparator 94 is just above the reference voltage value at the input 100. Then, the sensitivity control circuit switch 128 is positioned on an operating terminal 1-9, where the selection of the terminal is made with a view to the electromagnetic properties of the material to be detected, as described hereinbefore. With these adjustments of the resistor 72 and the switch 128 made, the detector is ready for use.

The suggested positions for use of the detector as indicated in FIGS. 1 and 2 are provided by way of example only. The detector of the present invention may find use in virtually any orientation, and in conjunction with virtually any type of material handling system. However, by way of example rather than limitation, the installation illustrated in FIG. 1 is considered. With no material in the bin 12, or with the material level below that of the bottom of the antenna probe 16, the signal at the point A is uneffected by an external loading of the antenna probe. Consequently, the voltage level at input 92 is just above the reference level value at input 100, depending on the sensitivity control circuit switch 128. The greater the sensitivity setting of switch 128, the closer are the two voltage level values at inputs 92 and 100. Thus, the output from the comparator 94 is +V and the LED 116 is off. As material tends to fill the bin 12, the antenna probe 16 becomes at least partially surrounded by the material. As the impedance load of the antenna probe 16 decreases due to the material now surrounding the antenna probe, the amplitude of the signal at A decreases accordingly. As a result, the output voltage level from the converter 46 decreases, and the voltage level at point B drops so that the voltage level at the input 92 becomes less than that at the reference input 100. Then, the output from the comparator 94, available at the output terminal 106, becomes −V, and the LED 116 is turned on. At this point, the feedback circuit through the resistor 108 to the comparator input terminal 92 has lowered the voltage value at that input by, say, 20 millivolts. With the change in voltage value at the output terminal 106, the input signal to the control unit 34 changes, thereby causing the conveyor belt 28 to stop, in the case illustrated in FIG. 1.

As material is removed from the bin 12, the antenna probe 16 becomes clear of the material, and the load impedance of the antenna probe returns to its original value, representing the antenna probe being free of surrounding impedance-affecting material. When that occurs the amplitude of the signal at point A increases, causing the voltage level output from the converter 46 to rise. As the voltage level at point B increases, the value at the input terminal 92 of the comparator rises. When the value of the input at the terminal 92 becomes greater than the reference voltage value at input 100, the output signal at the terminal 102 returns to −V, thereby changing the voltage level at the output terminal 106 to approximately −V, and turning off the light of the LED 116. Also, the feedback to the input terminal 92 of the comparator 94 increases by 40 millivolts to a value 20 millivolts greater than the d-c voltage level generated by the converter 46 in response to the input signal from the point A. Thus, to change the value at the output terminal 106 again, the d-c voltage level generated by the converter 46 must become 20 millivolts more negative than the reference level value at the input 100.

The purpose of the feedback loop to the comparator input terminal 92 is to provide a stable performance of the level detector in the presence of noise or other extraneous effects which might cause the impedance load on the antenna probe 16 to undergo minor fluctuations. Such variations in the impedance load on the antenna probe 16 might also occur as material is poured into the bin 12 adjacent to the antenna probe. Thus, extraneous fluctuations in the impedance of the antenna probe 16, not reflective of the environmental changes intended to be detected according to the method of the present invention, will not affect the output signal of the switching circuit 48.

The output of the switching circuit 48 may be fed to a control unit, such as 34 described herein, for the purpose of operating one or more devices to reflect the environment of the antenna probe 16. Also, apparatus for changing that environment, such as systems for removing the material from the vicinity of the antenna probe 16, and/or for adding material thereto, may be operated through such a control unit 34. In the particular embodiment illustrated in FIGS. 1 and 2, the output from the switching circuit 48 may ultimately effect the addition of material to the container in which the antenna probe 16 is positioned, and/or control the removal of such material therefrom.

In the case of the arrangement shown in FIG. 2, the output from the terminal 106 of the switching circuit 48 of the lower detector 10″ may be used to cause the control unit 34 to initiate the addition of material to the bin 12′ by the material feed system 24. Thus, when the level of material in the bin 12′ falls below the level of detector 10″, the change in the voltage level at the output terminal 106 accompanying the rise in the d-c voltage level at point B may be used to operate a relay in the control unit 34 to turn on the feed system 24. If the material in the bin then rises in level beyond that of the level detector 10″, the change in the output valve at the terminal 106 of the lower level detector 10″ may simply not be used to stop the operation of the feed system 24. Such as cessation of operation by the feed system 24 may be effected, for example, by the material in the bin 12' reaching the level of the detector 10', thereby causing a drop in the voltage level at the point B therein, and a resulting change in the voltage at the terminal 106 of the switching circuit 48 of the level detector 10'. In that case, the control unit 34 may then be used to stop further operation of the feed system 24. Similarly, as the level of the material in the bin 12' falls below that of the upper level detector 10', the change in output from that particular detector may also not be used for initiating the operation of the feed system 24. the resumption of adding feed material to the bin 12' may be caused by the level of material in the bin 12' falling below that of the lower level detector 10".

The particular application of the level detector of the present invention, and the desired operation it is to control, will determine how the output signal from the switching circuit 48 is utilized, and will also, therefore, dictate the nature of the control unit 34, or control units, which may be employed. The switching circuit 48 may also be designed by replacing the positive feedback loop to the positive input 92 of the comparator 94 with a negative feedback loop to the input 100, thereby providing an analog output signal at terminal 102 for use in operating ancillary devices.

The antenna probe 16 may be of a variety of designs. A metal rod, or a metal cable appropriately extended, may be used as an antenna probe. The nature of the application may also render one or another intended designs more desirable. In view of the increased drive capability of the oscillator circuit 42, it will be appreciated that relatively long antenna probes may be used with the present invention. Furthermore, the ability to adjust the sensitivity of performance of the switching circuit 48 by means of the sensitivity control circuit 50 permits the reliable use of the present invention with a greater degree of flexibility in the selection of antenna design and construction.

It will be appreciated that the level detector of the present invention may be used to detect the presence or absence of a variety of materials, since virtually any material will have an effect on the impedance load of the antenna probe 16. Furthermore, the variations in degree of effect of different materials on the impedance load of the antenna probe may be compensated for with the present invention by appropriately adjusting the sensitivity control circuit as described hereinbefore. Thus, the calibration and switching circuit 48 may be ajusted so as to change the output signal at the terminal 106 as readily, and as reliably, by virtually any material with the same degree of exposure of the antenna probe 16 thereto.

The foregoing disclosure and description of the invention is illustrative and explanatory thereof, and various changes in the method steps as well as the details of the illustrated apparatus may be made in the scope of the appended claims without departing from the spirit of the invention.

I claim:

1. Apparatus for detecting the presence or absence of material at a location comprising:
    (a) signal generation means for providing an oscillatory signal;
    (b) antenna probe means for positioning at said location, and for receiving said oscillatory signal;
    (c) converter means for producing a voltage level whose value is dependent on the amplitude of said oscillatory signal;
    (d) switching means, operable by said voltage level, for producing an output signal dependent on the presence or absence of material at said location;
    (e) comparator means, as part of said switching means, whose output controls said output signal depending on the value of said voltage level produced by said converter means compared to a reference voltage level;
    (f) sensitivity control means, for selectively adjusting the sensitivity of response of said switching means, including voltage selection means for selectively providing voltage levels to said switching means to selectively determine the value of said reference voltage level whereby the magnitude of the variation of said voltage levl, produced by said converter means, required to effect a change in said output signal is so selectively determined; and
    (g) said voltage selection means further comprising a voltage divider including a plurality of resistors, and sensitivity switch means for selectively communicating voltages from contacts between resistors in said voltage divider to said switching means to so selectively determine the value of said reference voltage level.

2. Apparatus as defined in claim 1 further comprising an impedance bridge, including said antenna probe means, for providing input to said converter means that is dependent in amplitude on the impedance load of said antenna probe means.

3. Apparatus as defined in claim 2 wherein said oscillatory signal is so provided by said signal generation means as a constant-frequency, constant-amplitude signal.

4. Apparatus as defined in claim 3 wherein said switching means further comprises feedback means whereby said voltage level is increased or decreased, depending on the value of said comparator output, to define a voltage value range through which said voltage level must vary to cause said switching means output signal to vary.

5. Apparatus as defined in claim 4 wherein said switching means further comprises calibration means, and said impedance bridge further comprises variable resistance means, such that said voltage level may be adjusted relative to said reference voltage by variation of said variable resistance means, and whereby said calibration means indicates the condition of such adjustment.

6. Apparatus as defined in claim 5 wherein said signal generation means comprises:
    (a) first inverter circuit means for generating said oscillatory signal;
    (b) means for stabilizing the frequency of said oscillatory signal; and
    (c) second inverter circuit means for increasing the load capability of said oscillatory signal.

7. Apparatus as defined in claim 6 further comprising control unit means for receiving said output signal so produced by said switching means, and for controlling ancillary apparatus in response to said output signal.

8. Apparatus as defined in claim 1 wherein said switching means further comprises calibration means, and said impedance bridge further comprises variable resistance means, such that said voltage level may be adjusted relative to said reference voltage by variation of said variable resistance means, and whereby said calibration means indicates the condition of such adjustment.

9. Apparatus as defined in claim 1 wherein said switching means further comprises feedback means whereby said voltage level is increased or decreased, depending on the value of said comparator output, to define a voltage value range through which said voltage level must vary to cause said switching means output signal to vary.

10. Apparatus as defined in claim 1 wherein said switching means further comprises feedback means whereby said voltage level is increased or decreased, depending on the value of said comparator output, to define a voltage value range through which said voltage level must vary to cause said switching means output signal to vary.

11. Apparatus as defined in claim 1 further comprising control unit means for receiving said output signal so produced by said switching means, and for controlling ancillary apparatus in response to said output signal.

12. Apparatus as defined in claim 1 wherein said output signal is digital.

13. Apparatus as defined in claim 1 wherein said output signal is analog.

14. A system for monitoring the level of material in a container comprising:
 (a) antenna probe means for location within said container;
 (b) signal generation means for generating a constant amplitude oscillatory signal for loading said antenna probe means;
 (c) converter means for receiving said oscillatory signal so loaded on said antenna probe means, and for producing a voltage level dependent on the amplitude of said oscillatory signal so received;
 (d) switching means for receiving said voltage level so produced by said converter means, and providing an output signal dependent on the value of said voltage level compared to a reference level;
 (e) sensitivity control means for selectively adjusting the value of said reference level to so selectively adjust the sensitivity of response of said switching means, whereby the magnitude of the variation of said voltage level, produced by said converter means, required to effect a change in said output signal is so selectively determined; and
 (f) said sensitivity control means further comprising a voltage divider including a plurality of resistors, and sensitivity switch means for selectively communicating voltage from contacts between resistors in said voltage divider to said switching means to so selectively determine the value of said reference level.

15. A system as defined in claim 14 wherein:
 (a) said switching means comprises comparator means for comparing said voltage level, produced by said converter means, to said reference level;
 (b) said switching means further comprises feedback means whereby said voltage level is increased or decreased, depending on said comparator output, to thereby define a voltage range through which said voltage value so produced by said converter means must vary to cause said comparator output to vary;
 (c) said comparator output takes on values depending on the comparison of said voltage level with said reference level; and
 (d) said output signal so produced by said switching means is dependent on the value of said comparator output.

16. A system as defined in claim 15 further comprising:
 (a) variable resistor means cooperating with said antenna probe means to form an impedance bridge on which said oscillatory signal is impressed, whereby said converter means receives said oscillatory signal form a point between said variable resistor means and said antenna probe means; and
 () calibration means, as part of said switching means, whereby said variable resistor means may be selectively adjusted to determine and control the value of said voltage level relative to said reference level, and whereby said calibration means indicates the relationship between said voltage level and said reference level.

17. A system as defined in claim 16 further comprising control unit means for receiving said switching means output signal, and for controlling ancillary apparatus in response thereto.

18. A system as defined in claim 17 wherein said ancillary apparatus includes means for adding material to said container.

19. A system as defined in claim 17 wherein said ancillary apparatus includes means for removing material from said container.

20. A system as defined in claim 17 wherein said ancillary apparatus includes means for indicating the presence or absence of material at said antenna probe means.

21. A system as defined in claim 16 wherein said output signal is digital.

22. A system as defined in claim 16 wherein said output signal is analog.

23. A system as defined in claim 14 wherein said oscillatory signal is so generated by said signal generation means as a constant-frequency, constant-amplitude signal.

24. A system as defined in claim 14 wherein said signal generation means comprises:
 (a) first inverter circuit means for generating said oscillatory signal;
 (b) means for stabilizing the frequency of said oscillatory signal; and
 (c) second inverter circuit means for increasing the load capability of said oscillatory signal.

25. A system as defined in claim 14 wherein:
 (a) said switching means comprises comparator means for comparing said voltage level, produced by said converter means, to said reference level;
 (b) said switching means further comprises feedback means whereby said voltage level is increased or decreased, depending on said comparator output, to thereby define a voltage range through which said voltage value so produced by said converter means must vary to cause said comparator output to vary;
 (c) said comparator output takes on values depending on the comparison of said voltage level with said reference level; and
 (d) said output signal so produced by said switching means is dependent on the value of said comparator output.

26. A system as defined in claim 14 further comprising:

(a) variable resistor means cooperating with said antenna probe means to form an impedance bridge on which said oscillatory signal is impressed, whereby said converter means receives said oscillatory signal from a point between said variable resistor means and said antenna probe means; and (b) calibration means, as part of said switching means, whereby said variable resistor means may be selectively adjusted to determine and control the value of said voltage level relative to said reference level, and whereby said calibration means indicates the relationship between said voltage level and said reference level.

27. A system as defined in claim 14 further comprising control unit means for receiving said switching means output signal, and for controlling ancillary apparatus in response thereto.

28. A system as defined in claim 27 wherein said ancillary apparatus includes means for adding material to said container.

29. A system as defined in claim 27 wherein said ancillary apparatus includes means for removing material from said container.

30. A system as defined in claim 27 wherein said ancillary apparatus includes means for indicating the presence or absence of material at said antenna probe means.

31. A system as defined in claim 14 wherein said output signal is digital.

32. A system as defined in claim 14 wherein said output signal is analog.

33. A system as defined in claim 14 further comprising at least one additional combination of antenna probe means, signal generation means, converter means, switching means, and sensitivity control means, as defined in claim 20, wherein said antenna probe means is locatable at a level different from that of the first antenna probe means of claim 20.

34. A system as defined in claim 33 further comprising control means for receiving the output signals from the switching means of said systems, and for controlling ancillary apparatus in response thereto.

35. A system as defined in claim 34 wherein said ancillary apparatus includes means for adding material to said container.

36. A system as defined in claim 34 wherein said ancillary apparatus includes means for removing material from said container.

37. A system as defined in claim 34 wherein said ancillary apparatus includes means for indicating the presence or absence of material at said antenna probe means.

38. A method of monitoring the presence or absence of material at a location comprising the following steps:

(a) providing an antenna probe positioned at said location;

(b) providing a variable resistor, cooperating with said antenna probe to form an impedance bridge;

(c) providing a converter circuit for converting oscillatory signals to voltage level values dependent on the amplitude of the oscillatory signal so converted;

(d) providing a switching circuit for receiving such a voltage level value, and comparing said voltage level value with a reference level, and producing an output signal dependent on said comparison;

(e) providing feedback means, as part of said switching circuit, for defining a voltage range through which said voltage level must vary to alter said output signal;

(f) providing sensitivity control means for selectively adjusting the value of said reference level;

(g) impressing an oscillatory signal on said impedance bridge; transmitting said oscillatory signal from a point on said impedance bridge, between said variable resistor and said antenna probe to said converter circuit for conversion thereby to a voltage level; and applying said voltage level to said switching circuit; and (h) generating an output signal by said switching circuit in accordance with the comparison of said voltage level with said reference level.

39. A method as defined in claim 38 further comprising the additional step of adjusting said variable resistor, with no material to be detected at said location, so that said voltage level is just above the value of said reference level.

40. A method as described in claim 38 further comprising the additional step of adjusting said sensitivity control means to alter the value of said reference level.

41. A method as described in claim 38 further comprising the additional steps of:

(a) providing control means for receiving said output signal; and (b) controlling ancillary apparatus by said control means in response to said output signal.

42. A method as described in claim 41 comprising the additional step of employing said ancillary apparatus for adding material generally at said location.

43. A method as described in claim 41 comprising the additional step of employing said ancillary apparatus for removing material generally from said location.

44. A method as described in claim 38 further comprising the additional steps of carrying out the steps of claim 38 for at least one additional antenna probe at a different location to produce at least one additional output signal.

45. A method as described in claim 44 further comprising the additional steps of:

(a) providing control means for receiving said output signals; and (b) controlling ancillary apparatus by said control means in response to said output signals.

46. A method as described in claim 45 comprising the additional step of employing said ancillary apparatus for adding material generally at said locations.

47. A method as described in claim 45 comprising the additional step of employing said ancillary apparatus for removing material generally from said locations.

* * * * *

UNITED STATES PATENT AND TRADEMARK OFFICE
CERTIFICATE OF CORRECTION

PATENT NO. : 4,222,267
DATED : September 16, 1980
INVENTOR(S) : Joe L. Aldrich

It is certified that error appears in the above–identified patent and that said Letters Patent are hereby corrected as shown below:

In column 12, line 15, replace "levl" with --level--;

In column 12, line 61, replace "1" with --2--;

In column 13, line 1, replace "1" with --2--;

In column 14, line 12, replace "0" with --(b)--;

In column 15, line 36, replace "20" with --14--;

In column 15, line 38, replace "20" with --14--.

Signed and Sealed this

Thirty-first Day of July 1984

[SEAL]

Attest:

GERALD J. MOSSINGHOFF

*Attesting Officer*  *Commissioner of Patents and Trademarks*